United States Patent
Jain et al.

(10) Patent No.: US 11,489,758 B1
(45) Date of Patent: Nov. 1, 2022

(54) PATH COMPUTATION FOR UNORDERED INCLUSION AND REGIONAL REVISIT CONSTRAINTS

(71) Applicant: Ciena Corporation, Hanover, MD (US)

(72) Inventors: Ankur Jain, Gurgaon (IN); John Wade Cherrington, Salt Spring Island (CA); Suvendu Kumar Barik, Noida (IN); Sourabh Vijay, Jaipur (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/480,198

(22) Filed: Sep. 21, 2021

(30) Foreign Application Priority Data

Aug. 9, 2021 (IN) .............................. 202111035915

(51) Int. Cl.
| | | |
|---|---|---|
| *H04L 45/122* | (2022.01) | |
| *H04L 45/02* | (2022.01) | |
| *H04L 45/00* | (2022.01) | |
| *H04L 45/586* | (2022.01) | |
| *H04L 45/24* | (2022.01) | |

(52) U.S. Cl.
CPC ............ *H04L 45/122* (2013.01); *H04L 45/02* (2013.01); *H04L 45/24* (2013.01); *H04L 45/586* (2013.01); *H04L 45/66* (2013.01)

(58) Field of Classification Search
CPC ....... H04L 45/122; H04L 45/02; H04L 45/24; H04L 45/586; H04L 45/66
See application file for complete search history.

(56) References Cited

U.S. PATENT DOCUMENTS

| | | |
|---|---|---|
| 3,942,226 A | 3/1976 | Barnett |
| 7,477,843 B1 | 1/2009 | Peeters et al. |
| 9,106,518 B1 | 8/2015 | Presotto et al. |
| 9,154,367 B1 | 10/2015 | Kontothanassis et al. |
| 9,503,228 B2 | 11/2016 | Subhedar et al. |
| 9,537,770 B1 | 1/2017 | Jain et al. |
| 9,838,271 B2 | 12/2017 | Djukic et al. |
| 9,948,387 B2 | 4/2018 | Frankel et al. |
| 10,511,517 B2 | 12/2019 | Subhedar et al. |
| 10,515,132 B2 | 12/2019 | Jain et al. |
| 10,608,954 B2 | 3/2020 | Gosselin-Harris et al. |
| 10,623,126 B2 | 4/2020 | Littlewood et al. |
| 2012/0127875 A1* | 5/2012 | Zhao ................. H04L 12/4625 370/252 |
| 2014/0372627 A1 | 12/2014 | Axelrod et al. |

(Continued)

*Primary Examiner* — Hermon Asres
(74) *Attorney, Agent, or Firm* — Clements Bernard Baratta; Lawrence A. Baratta, Jr.; Christopher L. Bernard (57) ABSTRACT

Systems and methods include receiving a request for a path from a source node to a destination node in a network with the request including N unordered inclusion nodes, N≥1; adding a virtual vertex in a graph with edges connected to each of the N inclusion nodes, wherein the graph includes the virtual vertex, vertices representing nodes in the network, and edges representing links; determining a shortest path from the source node to the virtual vertex and removing an edge from a first inclusion node, that is on the shortest path, from the virtual vertex; if N>1, determining a shortest path N times to find path segments between the N inclusion nodes, removing an edge from each of the N inclusion nodes from the virtual vertex when on a corresponding shortest path; and determining a shortest path from a last inclusion node to the destination node.

20 Claims, 6 Drawing Sheets

(56) References Cited

U.S. PATENT DOCUMENTS

| | | | |
|---|---|---|---|
| 2015/0256442 A1* | 9/2015 | Hu | H04L 45/12 |
| | | | 370/254 |
| 2015/0281317 A1 | 10/2015 | Du et al. | |
| 2016/0057733 A1* | 2/2016 | Grandillo | H04W 40/04 |
| | | | 370/312 |
| 2021/0218635 A1 | 7/2021 | Cherrington et al. | |

* cited by examiner

PATH COMPUTATION FOR UNORDERED INCLUSION AND REGIONAL REVISIT CONSTRAINTS

FIELD OF THE DISCLOSURE

The present disclosure generally relates to path computation in networks. More particularly, the present disclosure relates to systems and methods for path computation for unordered inclusion and regional revisit constraints.

BACKGROUND OF THE DISCLOSURE

Path computation is a requirement in networking where given a source A and a destination Z, what paths are available, considering constraints and user requirements. As is known in the art, there are various path computation algorithms, such as finding a shortest path, k-shortest paths (k≥1), and the like, via use graph techniques where network nodes are vertices and network links are edges. One particular constraint that is widely requested/expected by users in the network management and planning space are inclusion constraints, under which path optimization is subject to routes that must visit one or more specified vertices. As described herein, an inclusion is a node in the network. Inclusion constraints come in two typical variations:

Unordered inclusions—the user does not specify order in which vertices are visited and thus expects the path computation to find the best path among all possible orderings. Typically, no revisit of referenced vertex is allowed.

Ordered inclusions—the user specifies order in which vertices are visited. Typically, no revisit of referenced vertex is allowed.

The ordered inclusion constraint can be found by solving a series of shortest path problems, one for each segment.

The unordered constraint problem is NP-complete. A solution in P (with polynomial complexity) would provide a solution to the famous Travelling Salesperson Problem (TSP). As TSP has been proven to be NP-complete, this creates acute challenges for practical implementations of unordered constraints in a Path Computation Element (PCE) associated with a network, as the compute resources needed scale faster than any polynomial.

Regional revisit—An additional constraint (taken alone or combined with inclusions) is the forbidding of regional revisit. As described herein, define a region as any subgraph of the full routing graph identifiable at the time of running the path computation. In an optical network (Layer 0), control plane managed optical services are forbidden from being routed through the same network element (even if ports and equipment are technically available for such a routing). It is important to note that the network element is generally not reducible to a single vertex, so revisit is not automatically forbidden by a Dijkstra algorithm.

A second example comes from the Layer 2 space. In this domain, the regions of relevance are not nodes but rather groups of network elements that have been engineered according to a certain extended pattern, for example G.8032 Ethernet protection rings or ad hoc logical rings. A typical requirement would be to find a path that uses multiple rings, but does not return to the same ring (even though this is clearly possible at the level of link and node routing).

Solving the regional revisit constraint in general (in particular where there are many small domains, such as network elements) is computationally hard. Conventional approaches rely here on k-shortest path, and filtering in post-processing for paths that satisfy regional revisit. The k-shortest path/enumerative approach has, in typical implementations, been particularly expensive when combined with inclusion constraint as it is run in each segment.

Summarizing, the general "state of the art" is:

All permutations within an unordered inclusion set need to be attempted in an outer loop (for an exact solution).

Each ordering in outer loop breaks into N+1 Dijkstra if there are N segments.

An open-loop k-shortest path enumeration needs to run in order to filter out paths that have any forbidden regional revisit.

Determining all permutations followed by all segment shortest path has poor scaling with anything other than very small number of inclusions. An enumerative approach—find all possible paths and select for those that include. This has large time and space complexity (e.g., the B heap in Yen algorithm will grow). There can be uncontrolled approximations of above, i.e., use random permutation of inclusions to solve easier ordered inclusions, or else have ad-hoc cut-off/space bounds on k-shortest enumeration. The problem with these is these approached do not have properties that are easy to reason about or have established results, in particular they do not provide a bounded worst case or average case approximation to global optimum nor an intuitive concept of when they will be good or bad approximations.

BRIEF SUMMARY OF THE DISCLOSURE

The present disclosure relates to systems and methods for path computation for unordered inclusion and regional revisit constraints. The present disclosure utilizes an efficient mapping of a Traveling Salesperson (TSP) heuristic to make bounded approximation to shortest path for unordered conclusion. The heuristic is shown to be particular strong approximation when weight is symmetric in both directions of edge traversal, a near-universal assumption in networking, i.e., transport routing for optical services, Time Division Multiplexed (TDM) services, packet services, etc. With respect to regional revisit constraint, there is an additional strategy that shortens the length of in-practice k-shortest path search.

In various embodiments, a method includes steps, an apparatus includes memory storing instructions that, when executed, cause the at least one processor to implement the steps, and a non-transitory computer-readable medium having instructions stored thereon for programming a processing device to perform the steps. The steps include receiving a request for a path from a source node to a destination node in a network with the request including N unordered inclusion nodes, N≥1; adding a virtual vertex in a graph with edges connected to each of the N unordered inclusion nodes, wherein the graph includes the virtual vertex, vertices representing nodes in the network, and edges representing links in the network; determining a shortest path from the source node to the virtual vertex and removing an edge from a first inclusion node, that is on the shortest path, from the virtual vertex; if N>1, determining a shortest path N times to find path segments between the N unordered inclusion nodes, removing an edge from each of the N unordered inclusion nodes from the virtual vertex when on a corresponding shortest path; and determining a shortest path from a last unordered inclusion node to the destination node.

The steps can further include either removing or ignoring all edges out of the N unordered inclusion nodes while there is an edge to the virtual vertex, to avoid regional revisit on a path segment. The network can be an optical network, and the regional revisit includes avoidance of a same network element more than once. The network can be an Ethernet network, and the regional revisit includes avoidance of a same protection or logical ring more than once. The determining a shortest path can be k-shortest paths. The steps can further include concurrently performing a path computation from the destination node to the source node via path segments; and terminating when a path is found first in either direction. The determining the shortest path from the source node to the virtual vertex can include forcing a first segment through each of the N unordered inclusion nodes.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for path computation for unordered inclusion and regional revisit constraints. The present disclosure utilizes an efficient mapping of a Traveling Salesperson (TSP) heuristic to make bounded approximation to shortest path for unordered conclusion. The heuristic is shown to be particular strong approximation when weight is symmetric in both directions of edge traversal, a near-universal assumption in networking, i.e., transport routing for optical services, Time Division Multiplexed (TDM) services, packet services, etc. With respect to regional revisit constraint, there is an additional strategy that shortens the length of in-practice k-shortest path search.

Network

In networks and the like, control planes provide automatic allocation of network resources in an end-to-end manner. Exemplary control planes may include Automatically Switched Optical Network (ASON) as defined in G.8080/Y.1304, Architecture for the automatically switched optical network (ASON) (February 2005), the contents of which are herein incorporated by reference; Generalized Multi-Protocol Label Switching (GMPLS) Architecture as defined in Request for Comments (RFC): 3945 (October 2004) and the like, the contents of which are herein incorporated by reference; or any other type control plane for controlling network elements at one or more layers, and establishing connections there between. As described herein, these control planes may be referred to as control planes as they deal with routing signals at Layers 1-3, i.e., time division multiplexing (TDM) signals such as, for example, Synchronous Optical Network (SONET), Synchronous Digital Hierarchy (SDH), Optical Transport Network (OTN), Ethernet, MPLS, and the like. Control planes are configured to establish end-to-end signaled such as sub-network connections (SNCs) in ASON or OSRP and label switched paths (LSPs) in GMPLS and MPLS. All control planes use the available paths to route the services and program the underlying hardware. Also, as described herein, the terms "paths" and "routes" may be used interchangeably as referring to a sequence of hops over the links 120 from a source node 110A to a destination node 110Z. Those skilled in the art will recognize different networking layers may use these terms for different meanings, and the present disclosure contemplates any such definition.

Control planes generally support two type of automated provisioning mechanisms for determining a route for connection establishment: 1) route information is explicitly specified by an operator; or 2) an optimal route computation is automatically performed by control plane, using a constraint-based routing algorithm. Conventionally, constraint-based routing algorithms determine a path in a network based on several constraints such as available bandwidth, delay, administrative weights, priority, fragmentation, etc.

Figure 1:
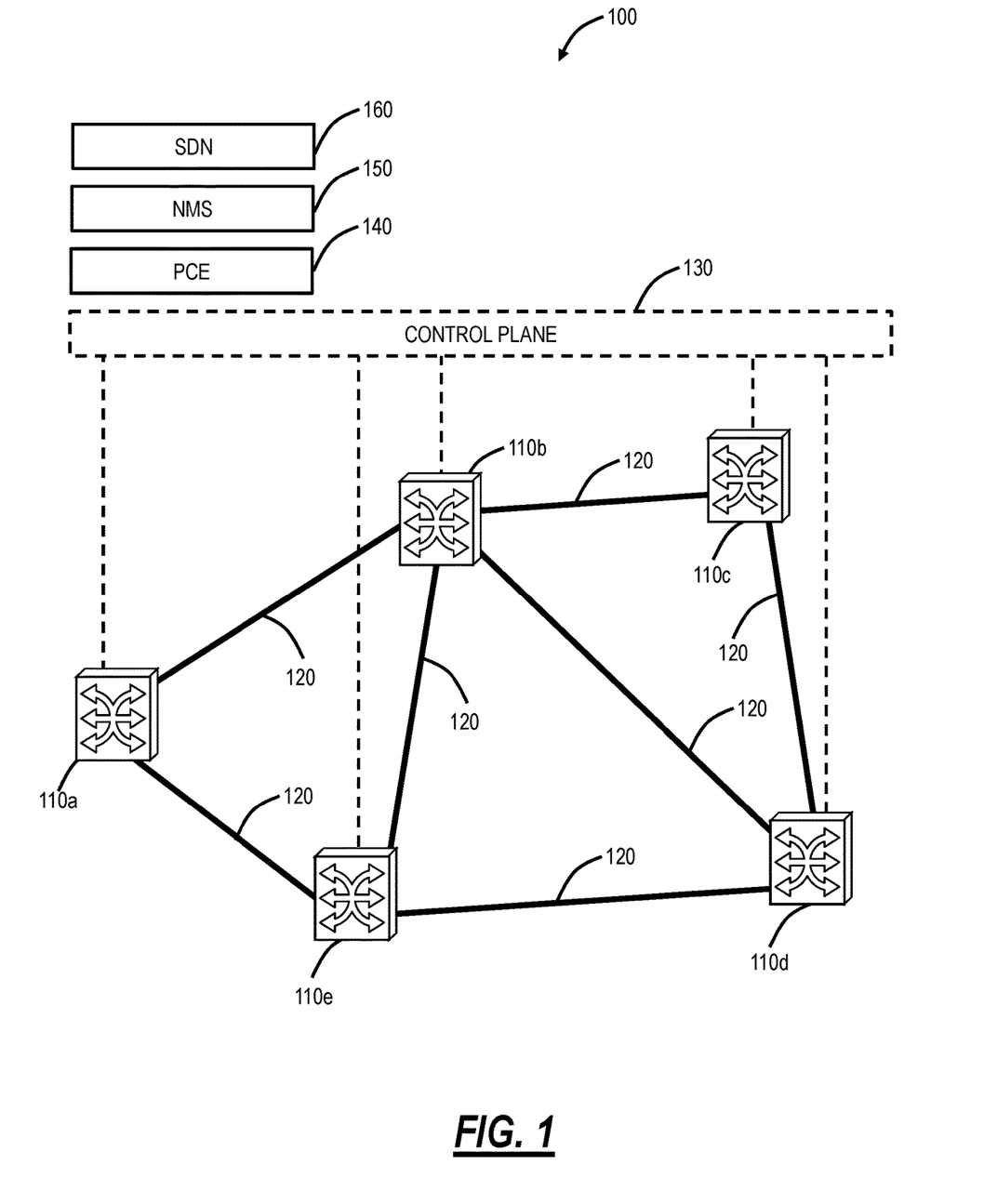
FIG. 1 is a network diagram of an example network with five interconnected nodes.

FIG. 1 is a network diagram of an example network 100 with five interconnected nodes 110a, 110b, 110c, 110d, 110e. The nodes 110 are interconnected through a plurality of links 120. The nodes 110 communicate with one another over the links 120. The nodes 110 can be network elements such as switches, routers, cross-connects, add/drop multiplexers, etc. (i.e., any network device) which include a plurality of ingress and egress ports communicatively coupled directly or via mapping/multiplexing over the links 120. The network 100 is illustrated with the nodes 110 in an interconnected mesh topology for illustration purposes. Those of ordinary skill in the art will recognize that the network 100 can include more or less nodes 110 and various topologies. The network 100 can include a control plane 130 operating on and/or between the nodes 110a, 110b, 110c, 110d, 110e. The control plane 130 includes software, processes, algorithms, etc. that control configurable features of the network 100, such as automating discovery of the nodes 110, capacity on the links 120, port availability on the nodes 110, connectivity between ports; dissemination of topology and bandwidth information between the nodes 110; calculation and creation of paths for connections; network level protection and restoration; and the like. The links 120 can include bandwidth at various layers such as optical capacity (e.g., wavelengths), time division multiplexing capacity (e.g., SONET, SDH, OTN, etc.), and packet capacity (e.g., Ethernet, MPLS, Internet Protocol (IP), etc.). In an exemplary embodiment, the control plane 130 can utilize various constraint-based routing protocols at any of the various layers such as, without limitation, Constrained Shortest Path First (CSPF), Constraint-based Routing Label Distribution Protocol (CR-LDP), Resource Reservation Protocol-Traffic Engineering (RSVP-TE), Private Network-to-Network Interface (PNNI), Open Shortest Path First (OSPF), OSPF-Traffic Engineering (OSPF-TE), Intermediate System to Intermediate System (IS-IS), and the like.

The path computed using CSPF is a shortest path fulfilling a set of constraints. It simply means that it runs shortest path algorithm after pruning those links that violate a given set of constraints. CR-LDP is an extension of LDP in MPLS to set up a Label Switched Path (LSP) based on explicit route constraints, quality of service constraints, and other constraints. For example, CR-LDP is described in RFC 3472, "Generalized Multi-Protocol Label Switching (GMPLS), Signaling Constraint-based Routed Label Distribution Protocol (CR-LDP) Extensions," (January 2003), the contents of which are incorporated by reference herein. RSVP-TE is an extension of the resource reservation protocol (RSVP) for traffic engineering. RSVP-TE is detailed in IETF RFC 3209, "RSVP-TE: Extensions to RSVP for LSP Tunnels," (December 2001), and updated by RFC 5151, "Inter-Domain MPLS and GMPLS Traffic Engineering—Resource Reservation Protocol-Traffic Engineering (RSVP-TE) Extensions," (February 2008), the contents of each are incorporated by reference herein. RSVP-TE is also detailed in ITU Recommendation G.7713.2/Y.1704.2 (March 03), "Distributed Call and Connection Management: Signaling mechanism using GMPLS RSVP-TE," the contents of which are incorporated by reference herein. RSVP-TE generally allows the establishment of LSPs, taking into consideration network constraint parameters such as available bandwidth and explicit hops. OSPF is a link-state routing protocol that computes a shortest path tree for each route using a method based on Dijkstra's algorithm that considers OSPF routing policies which are governed by link cost factors.

OSPF is described, for example, in RFC 2328, "OSPF Version 2," (April 1998) and RFC 5340, "OSPF for IPv6," (July 2008), the contents of each are incorporated by reference herein. OSPF-TE is an extension to OSPF extending the expressivity to allow for traffic engineering and use on non-IP networks, and is described in RFC 3630, "Traffic Engineering (TE) Extensions to OSPF Version 2," (September 2003), the contents of which are incorporated by reference herein. IS-IS is similar to OSPF but includes type-length-value (TLV) data to enable easy expansion without redesigning the protocol. IS-IS is described, for example, in RFC 1142, "051 IS-IS Intra-domain Routing Protocol," (February 1990), the contents of which are incorporated herein. The opportunity-based path computation systems and methods contemplate operation with any constraint-based routing algorithm such as the aforementioned techniques. Those of ordinary skill in the art will recognize the network 100 and the control plane 130 can utilize any type control plane for controlling the nodes 110 and establishing connections therebetween along with any constraint-based routing algorithm.

The network 100 can include other components including a Path Computation Element (PCE) 140, Network Management System (NMS) 150, and a Software Defined Networking (SDN) controller 160. Each of these elements 140, 150, 160 can be a processing device, server, cluster, application, etc. The PCE 140 is configured to determine and find a suitable route for conveying data between a source and a destination. For example, PCE standard include RFC 4655, "A Path Computation Element (PCE)-Based Architecture," (August 2006), the contents of which are incorporated by reference herein. The NMS 150 is used to provision, discover, monitor, and maintain the network 100. The SDN controller 160 can also be communicatively coupled to the network 100. SDN is an emerging framework which includes centralized control decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 160 knowing a full network topology through configuration or through the use of a controller-based discovery process in the network 100.

The present disclosure relates to for path computation for unordered inclusion and regional revisit constraints in the network 100. The path computation contemplates use through any of the control plane 130, the PCE 140, the NMS 150, and the SDN controller 160. Further, the path computation contemplates "in-skin" operation as well on any of the nodes 110 (network elements). "In-skin" means a local computation in a network element. For example, the control plane 130 can operate "in-skin" on the nodes 110 through a controller thereon. Further, the path computation contemplates using any protocol.

Example Processing Device Architecture

Figure 2:
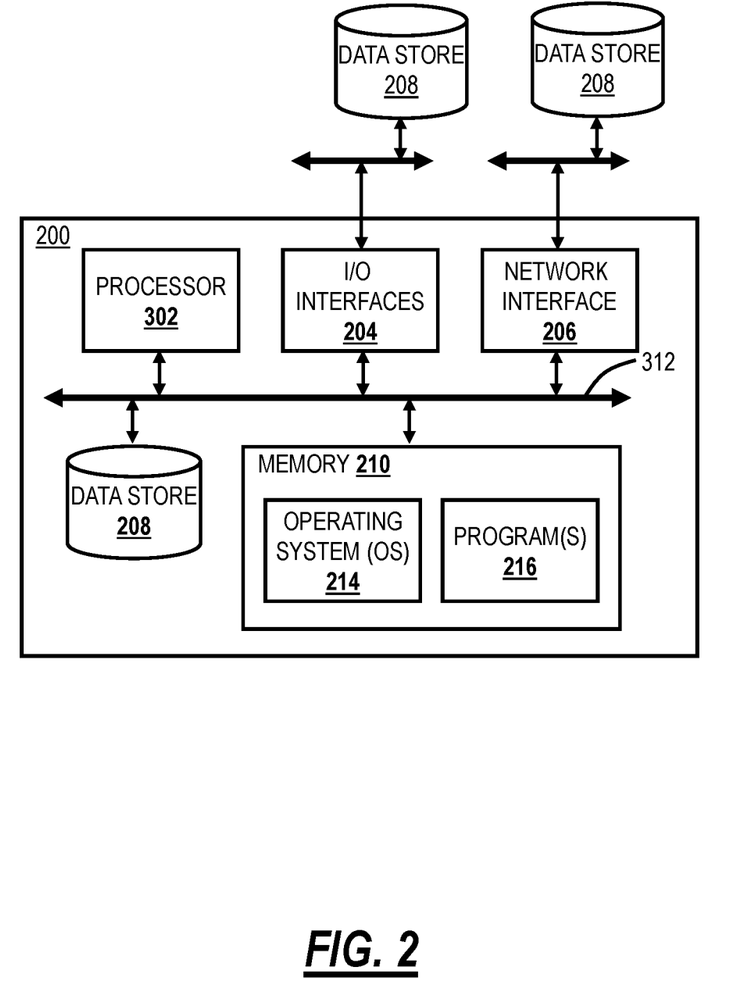
FIG. 2 is a block diagram of a processing device.

FIG. 2 is a block diagram of a processing device 200, which may be used as the controller on the nodes 110 for the control plane 130, the PCE 140, the NMS 150, the SDN controller 160, and the like. The processing device 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the processing device 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory 210, to communicate data to and from the memory 210, and to generally control operations of the processing device 200 pursuant to the software instructions. The I/O interfaces 204 may be used to receive user input from and/or for providing system output to one or more devices or components.

The network interface 206 may be used to enable the processing device 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing device 200, such as, for example, an internal hard drive connected to the local interface 212 in the processing device 200. Additionally, in another embodiment, the data store 208 may be located external to the processing device 200 such as, for example, an external hard drive connected to the I/O interfaces 204 (e.g., SCSI or USB connection). In a further embodiment, the data store 208 may be connected to the processing device 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Definition of Inclusion and Regional Revisit Constraints for a Network

Inclusions-One particular constraint that is widely requested/expected by users in the network management and planning space are inclusion constraints, under which path optimization is subject to routes that must visit one or more specified vertices. Here, there is a desire to have specific nodes 110 included in a route. The nodes 110 correspond to vertices in a graph and the links 120 correspond to edges in the graph.

Regional revisit—An additional constraint (taken alone or combined with inclusions) is the forbidding of regional revisit. In an optical layer of the network 110, control plane managed optical services are forbidden from being routed through the same node 110 (even if ports and equipment are technically available for such a routing). It is important to note that the node 110 is generally not reducible to a single vertex, so revisit is not automatically forbidden by Dijkstra. A second example comes from the Layer 2 space. In this domain, the regions of relevance are not nodes but rather groups of network elements that have been engineered according to a certain extended pattern, for example G.8032 protection rings or ad hoc logical rings. A typical requirement would be to find a path that uses multiple rings, but does not return to the same ring (even though this is clearly possible at the level of link and node routing).

Path Computation for Unordered Inclusion

Figure 3:
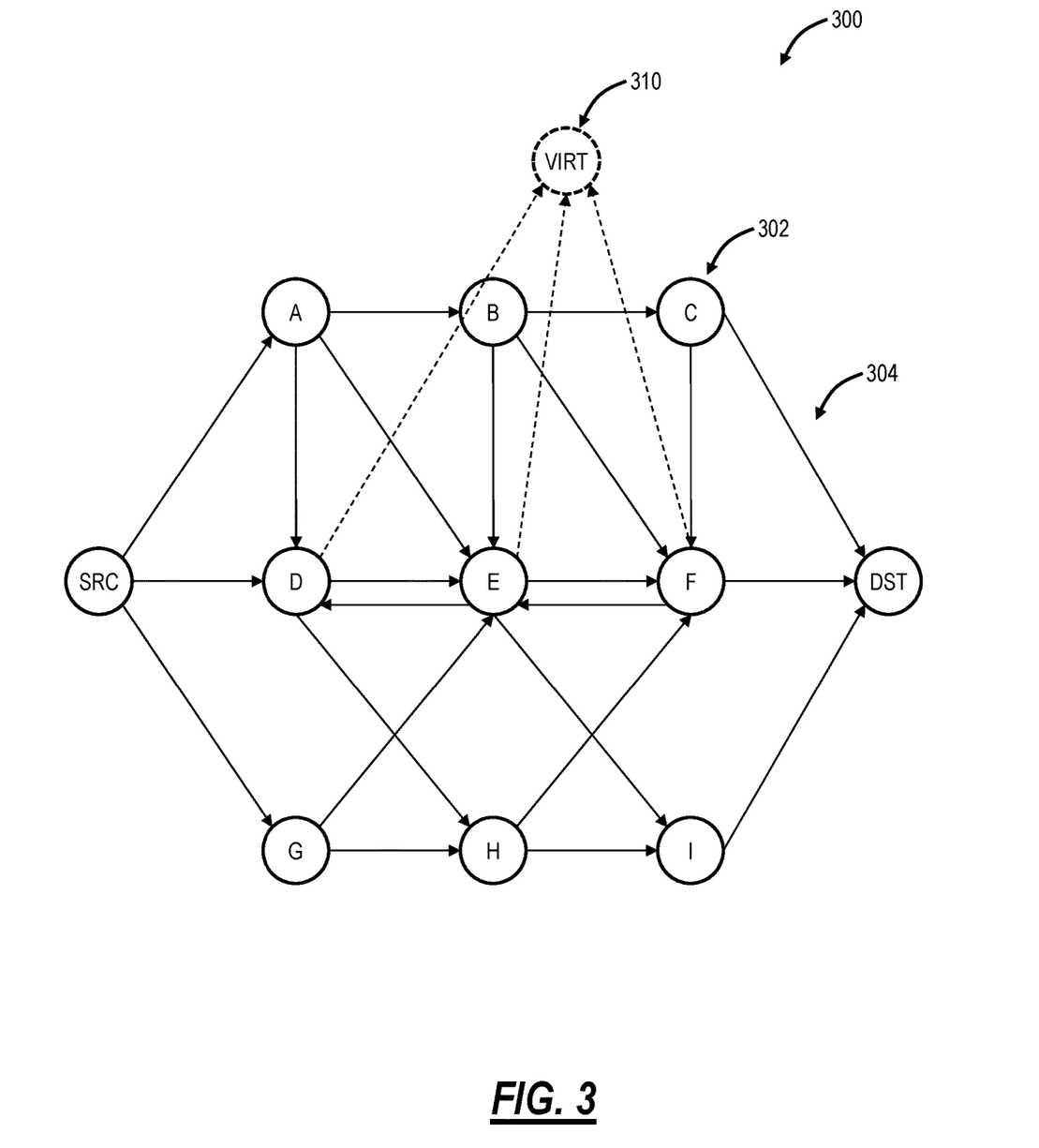
FIGS. 3 and 4 are a directed graph of an example network having nodes SRC, DST, A-I, for illustrating path computation for unordered inclusions.
Figure 4:
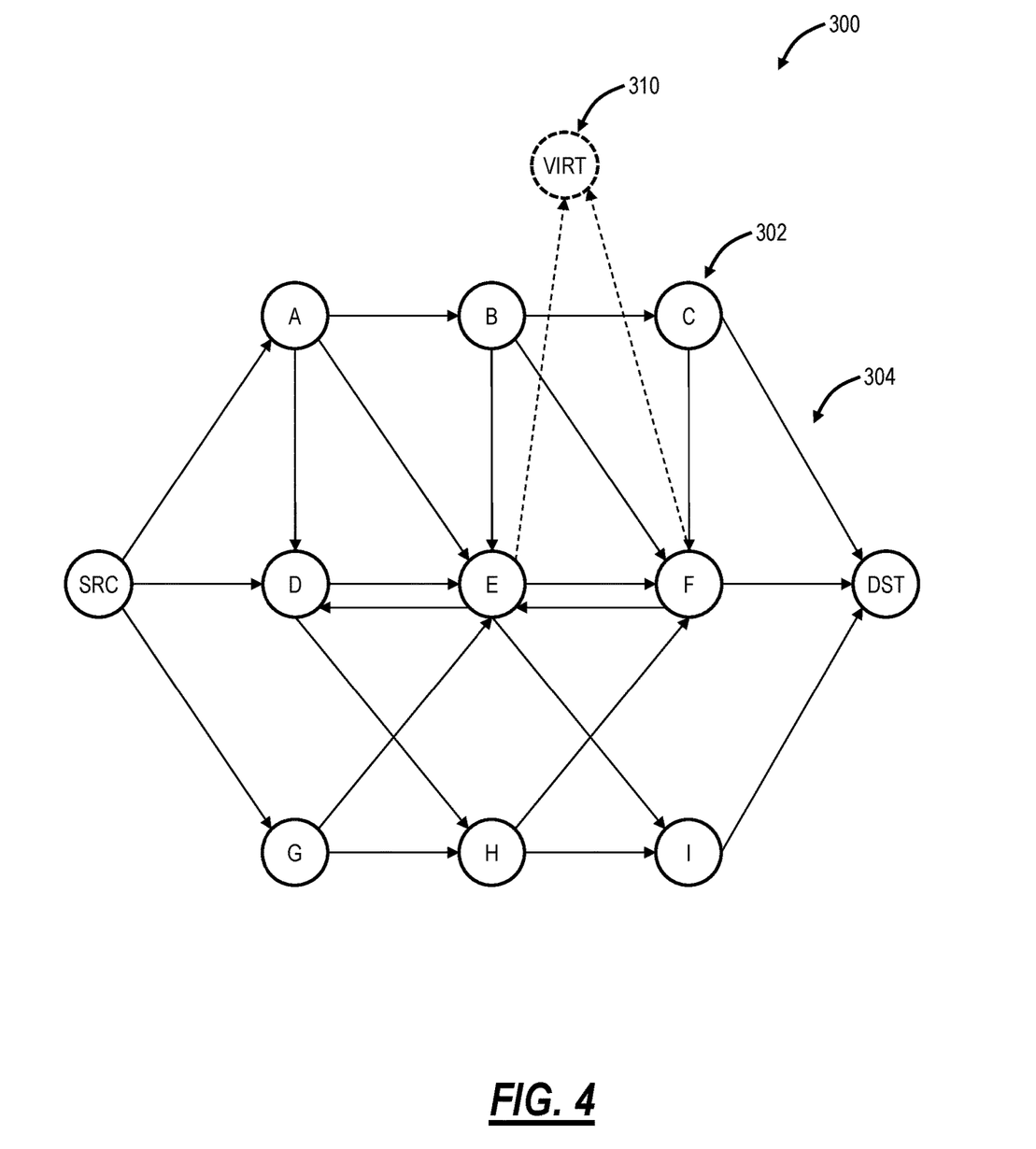

FIGS. 3 and 4 are a directed graph 300 of an example network having nodes SRC, DST, A-I, for illustrating path computation for unordered inclusions. As is known in the art, each vertex 302 is a node, network element, network device, etc. in the example network, and each directed edge 304 is a link in the example network that connects the nodes for routing of traffic. For example, the vertex 302 can be the node 110, and the directed edge 304 can be the link 120. The direction of the directed edges 304 corresponds to the flow of the traffic from the source node SRC to the destination node DST. Note, there is a directed edge 304 from the source node SRC to node A, but not from node A to the source node SRC, meaning traffic can only from the source node SRC to the node A. Conversely, there are bi-directional directed edges 304 between the nodes D, E and the nodes E, F, meaning traffic can go both ways.

There can be multiple directed graphs 300 for the example network, such as one for every SRC-DST pair. Thus, the path computation problem is not simply having a single graph for a network. The following description uses the vertex 302 and edges 304 for describing path computation in the example network with unordered inclusions.

A central aspect of the present disclosure is the ability to map a widely used and heavily researched heuristic ("nearest-neighbor") in the TSP domain to the corresponding PCE domain problem for unordered inclusions, without having to maintain or pre-computing on each call the complete path graph between all ports. It works by successively injection "virtual" vertices 310 to simultaneously find the nearest inclusion and its path at the same time, rather than pre-searching all paths up front. As described herein, a virtual vertex 310 is added to the directed graph 300 to deal with unordered inclusions, and generally a path is found from the node SRC to the virtual vertex 310 to address the unordered inclusions. The virtual vertex 310 starts connected to all of the unordered inclusions, and as each unordered inclusion node is found, it is removed, and the path computation process continues. Of note, the virtual vertex 310 does not represent a node in the network, but has edges to it from each unordered inclusion node. The virtual vertex 310 is used to find shortest path segments between the source node SRC, each unordered inclusion node, and the destination node DST. That is, by having an edge to each unordered inclusion node not yet part of a path segment, it is possible to find a next path segment to the virtual vertex to obtain a path to the next unordered inclusion node.

An example is now described with reference to the directed graph 300 where the nodes D, E, F are unordered inclusions for a path computation between the source node SRC and the destination node DST, i.e., consider the following network in which the unordered inclusion constraint requires visiting vertices {D, E, F}.

In Step 1, the virtual vertex 310 is attached to all inclusions, the nodes D, E, F, as illustrated in FIG. 3. Here, there is a directed edge 304 from all of the unordered inclusions to the virtual vertex 310. Then there is a path computation not from the source node SRC to the destination node DST, but from the source node SRC to the virtual vertex 310. This forces paths to terminate on the shortest of the inclusions; the shortest path from the source node SRC will be the first selected. In this example, a first shortest path from the source node SRC to the virtual vertex 310 will reach the virtual vertex 310 via the node D. Thus, the path computation will include a path from the source node SRC to the node D, In the following step, the process is repeated with the final vertex of the previous step removed, as illustrated in FIG. 4. In this example, if the node D is the shortest distance from the source node SRC, the next step will start with the virtual vertex 310 only connected to the remaining unordered inclusion nodes E, F, again as illustrated in FIG. 4. And a path computation is performed from the last node reached in the previously step to the virtual vertex 310. Here, this is from the node D to the virtual vertex 310. In this example, this path will hit the node E.

The procedure continues N times until shortest path to last remaining inclusion is found, and finally an N+1 step from last inclusion to the destination. The next step will find a path from the node E to the virtual vertex 310 which is only connected to the node F. Finally, the last path is from the last remaining inclusion to the destination node DST.

The key property is that at each step, the next inclusion routed is the shortest distance from the previous. While the equivalence of TSP and unordered inclusions is broadly recognized in the literature, there has not been application of TSP heuristics to the path computation domain for networks. One obvious reason for this is that there is a "pre-routing" assumption built into the standard definition of the TSP: often it is assumed that the distance (and implicitly, shortest path) has already been found among the TSP destinations of interest (corresponding to inclusions in PCE problem). That is, the standard form of TSP operates always on a complete graph where edges are labelled by a-priori given shortest path distance. A naïve translation of TSP heuristics would there correspond to, for example in optical routing, the maintenance of all shortest paths from all pairs of transponder/transceiver/modem ports—either using online algorithm or as pre-step in any given PCE call. While this would immediately unlock TSP heuristics, it comes at an obviously significant up-front cost. The approach described herein realizes the nearest neighbor heuristic without the need for any such pre-compute step.

Combining with Regional Revisit

Figure 5:
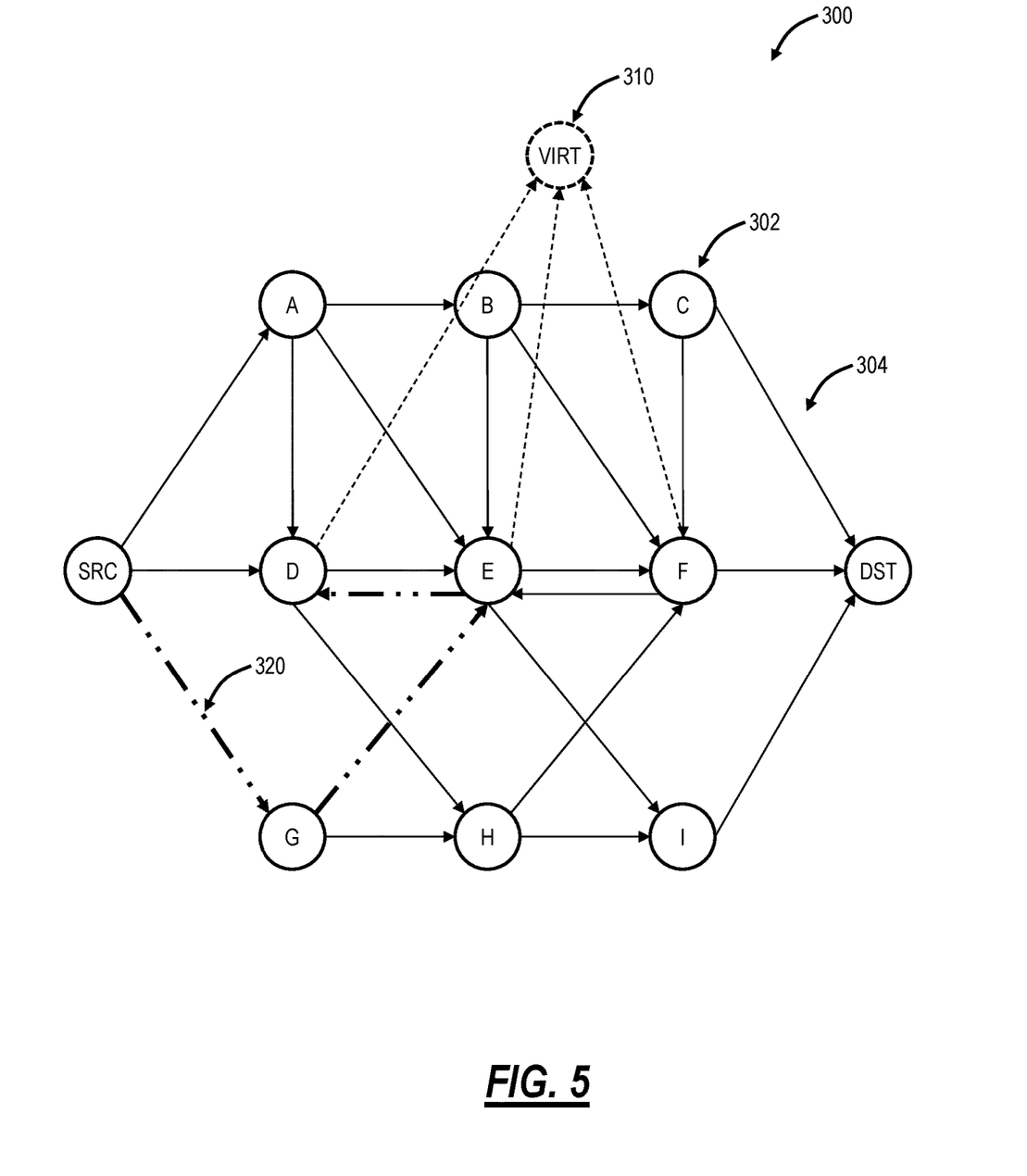
FIG. 5 is the directed graph of the example network having nodes SRC, DST, A-I, for illustrating path computation for unordered inclusions with regional revisit constraints.

FIG. 5 is the directed graph 300 of the example network having nodes SRC, DST, A-I, for illustrating path computation for unordered inclusions with regional revisit constraints. Again, regional revisit means we want to avoid nodes (edges 302). Another note, in a k-shortest path search, the objective is to find k paths, and it is possible to have some of the k paths revisit inclusion nodes to get to the virtual vertex 310.

If we can a-priori eliminate any regions from being revisited, then on each step, we can expect the k-shortest path search to be more efficient as less paths are considered. Here, on each segment/step of the process described above, remove all outgoing edges to the regions (e.g., network elements) that the specified inclusions are members of. This guarantees that the virtual vertex reachable only by paths that go through one of the included regions. Note, in addition to removing, it is possible to ignore these edges or to give them some arbitrarily high weight so they are avoided.

For example, in FIG. 5, during the first step, an indicated path 320 would not occur during a single shortest path context, as the node E will exit immediately to the virtual vertex 310. However, in a k-shortest path context (generally needed to satisfy additional constraints or provide choices to a user), there can be a revisitation of node D in a k-shortest iteration for step 1. This will create a problem in step 2 (or some other later step), as the node D may re-occur in that step but is already party of the step 1 path (Source→G→E→D→Destination) above. By removing all outgoing edges for all inclusion regions, we can ensure that revisiting of regions associated with included vertices is a priori excluded, leading to faster convergence of k-shortest paths.

Additional Note (Network Element Inclusion, OR Constraints)

The above consideration apply to inclusions specified at the port level (corresponding exactly to vertices at the directed graph level). An additional form of inclusion "nodal inclusion" allows for a user to specify an entire network element (corresponding to a collection of ports and internal connectivity sub-graph). This case is handled with above procedure by tying the virtual vertex 310 to some subset of vertices in the sub-graph that all paths have to pass through; a simple approach here is to attach to all egress ports of a node but a more efficient one is to identify the typically much smaller set of forwarding group vertices. In either case, the approach generalizes. More generally, we can think of this strategy as applying to any group of vertices that are in a "use this port OR this port OR . . . .".

Additional Note on Extending to Related Heuristics

The TSP literature has provided heuristics that improve on the original nearest neighbor. Several that can be accommodated within the present disclosure as mappable to PCE inclusion constraint are as follows:

Double-ended nearest-neighbor: this would repeat procedure in the opposite direction; in case of PCE this can be done in parallel. The shorter of two paths found through this parallel procedure would be used.

Repeated nearest-neighbor: The analog of this would be to force the first segment through each of the N inclusions, and use the specified procedure on the remaining N−1. Of all these results the shortest path is then chosen. While more expensive, this is still polynomial and serves as an enhanced approximation.

Final Notes on Integrated Solution

Using the simplest form given above or the parallelizable double-ended call as initial solution, if there is time remaining in a PCE response time budget and/or subject to user preferences we can decide to run the repeated nearest-neighbor. In the case where a small number of inclusions (up to 3 or 4, for example) are specified, we can use an exhaustive approach as the number of permutations are still small. Past the cut-off, we then switch to the approximation. A form of the regional revisit improvement is still available in this case.

Figure 6:
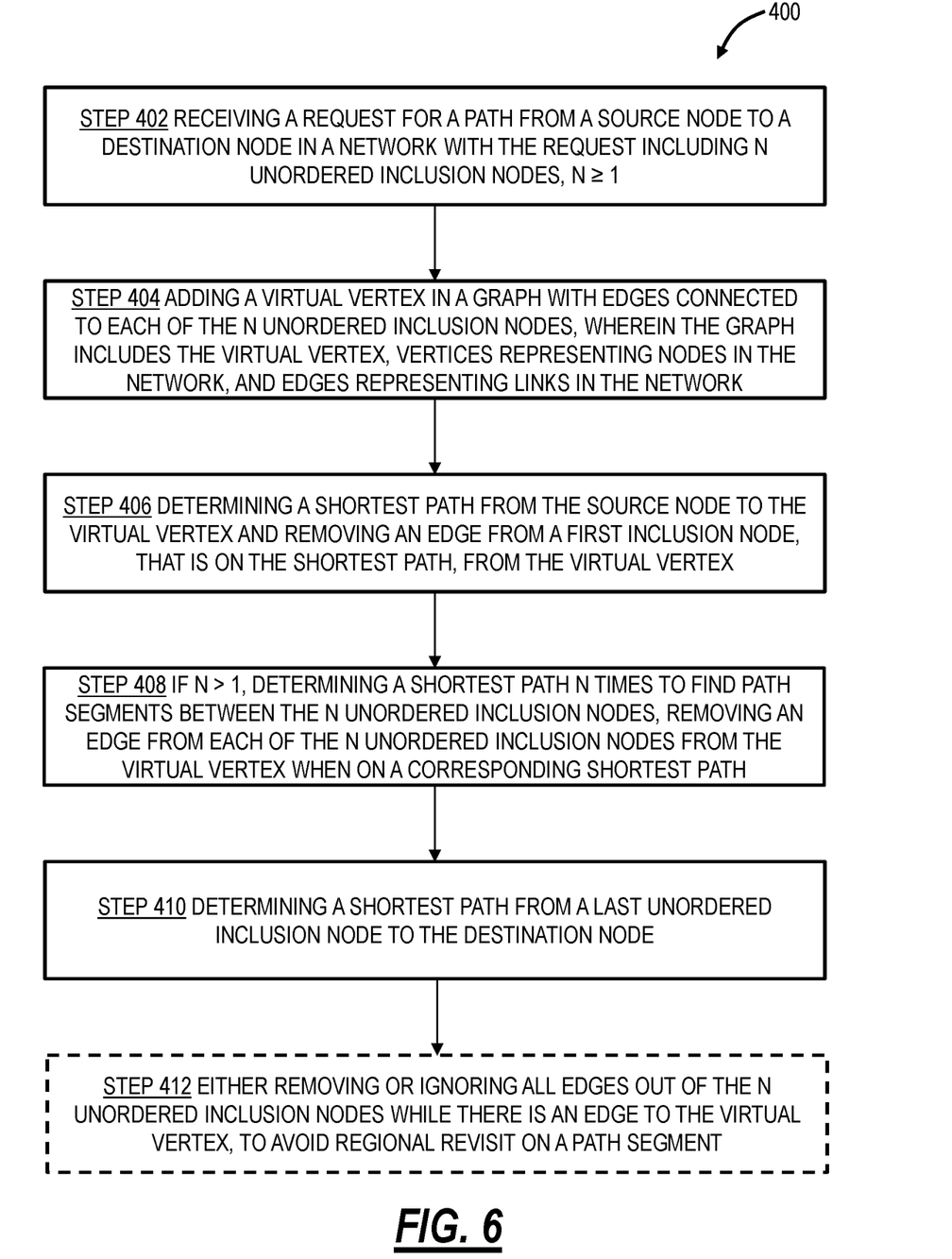
FIG. 6 is a flowchart of a path computation process for unordered inclusion and regional revisit constraints.

Path Computation Process for Unordered Inclusion and Regional Revisit Constraints FIG. 6 is a flowchart of a path computation process 400 for unordered inclusion and regional revisit constraints. The process 400 can be implemented as a method having steps, via the processing device 200 with software in the memory 210 configured to implement the steps, and a instructions embodied in a non-transitory computer-readable medium.

The process 400 includes receiving a request for a path from a source node to a destination node in a network with the request including N unordered inclusion nodes, N≥1 (step 402); adding a virtual vertex in a graph with edges connected to each of the N unordered inclusion nodes, wherein the graph includes the virtual vertex, vertices representing nodes in the network, and edges representing links in the network (step 404); determining a shortest path from the source node to the virtual vertex and removing an edge from a first inclusion node, that is on the shortest path, from the virtual vertex (step 406); if N>1, determining a shortest path N times to find path segments between the N unordered inclusion nodes, removing an edge from each of the N unordered inclusion nodes from the virtual vertex when on a corresponding shortest path (step 408); and determining a shortest path from a last unordered inclusion node to the destination node (step 410).

The process 400 can further include either removing or ignoring all edges out of the N unordered inclusion nodes while there is an edge to the virtual vertex, to avoid regional revisit on a path segment (step 412). The network can be an optical network, and the regional revisit includes avoidance of a same network element more than once. The network can be an Ethernet network, and the regional revisit includes avoidance of a same protection or logical ring more than once.

The determining a shortest path can be k-shortest paths. The process 400 can further include concurrently performing a path computation from the destination node to the source node via path segments; and terminating when a path is found first in either direction. The determining the shortest path from the source node to the virtual vertex can include forcing a first segment through each of the N unordered inclusion nodes.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium having instructions stored thereon for programming a processing device to perform steps of:
   receiving a request for a path from a source node to a destination node in a network with the request including N unordered inclusion nodes, N≥1;
   adding a virtual vertex in a graph with edges connected to each of the N unordered inclusion nodes, wherein the graph includes the virtual vertex, vertices representing nodes in the network, and edges representing links in the network, wherein the virtual vertex does not represent a node in the network and includes edges to it form each of the N unordered inclusion nodes for determining paths thereto;
   determining a shortest path from the source node to the virtual vertex and removing an edge from a first inclusion node, that is on the shortest path, from the virtual vertex;
   if N>1, determining a shortest path N times to find path segments between the N unordered inclusion nodes, removing an edge from each of the N unordered inclusion nodes from the virtual vertex when on a corresponding shortest path; and
   determining a shortest path from a last unordered inclusion node to the destination node.

2. The non-transitory computer-readable medium of claim 1, wherein the steps further include
   either removing or ignoring all edges out of the N unordered inclusion nodes while there is an edge to the virtual vertex, to avoid regional revisit on a path segment.

3. The non-transitory computer-readable medium of claim 2, wherein the network is an optical network, and the regional revisit includes avoidance of a same network element more than once.

4. The non-transitory computer-readable medium of claim 2, wherein the network is an Ethernet network, and the regional revisit includes avoidance of a same protection or logical ring more than once.

5. The non-transitory computer-readable medium of claim 1, wherein the determining a shortest path is k-shortest paths.

6. The non-transitory computer-readable medium of claim 1, wherein the steps further include
   concurrently performing a path computation from the destination node to the source node via path segments; and
   terminating when a path is found first in either direction.

7. The non-transitory computer-readable medium of claim 1, wherein the determining the shortest path from the source node to the virtual vertex includes forcing a first segment through each of the N unordered inclusion nodes.

8. A method comprising steps of:
   receiving a request for a path from a source node to a destination node in a network with the request including N unordered inclusion nodes, N≥1;
   adding a virtual vertex in a graph with edges connected to each of the N unordered inclusion nodes, wherein the graph includes the virtual vertex, vertices representing nodes in the network, and edges representing links in the network, wherein the virtual vertex does not represent a node in the network and includes edges to it from each of the N unordered inclusion nodes for determining paths thereto;

determining a shortest path from the source node to the virtual vertex and removing an edge from a first inclusion node, that is on the shortest path, from the virtual vertex;

if N>1, determining a shortest path N times to find path segments between the N unordered inclusion nodes, removing an edge from each of the N unordered inclusion nodes from the virtual vertex when on a corresponding shortest path; and determining a shortest path from a last unordered inclusion node to the destination node.

9. The method of claim 8, wherein the steps further include either removing or ignoring all edges out of the N unordered inclusion nodes while there is an edge to the virtual vertex, to avoid regional revisit on a path segment.

10. The method of claim 9, wherein the network is an optical network, and the regional revisit includes avoidance of a same network element more than once.

11. The method of claim 9, wherein the network is an Ethernet network, and the regional revisit includes avoidance of a same protection or logical ring more than once.

12. The method of claim 8, wherein the determining a shortest path is k-shortest paths.

13. The method of claim 8, wherein the steps further include
concurrently performing a path computation from the destination node to the source node via path segments; and
terminating when a path is found first in either direction.

14. The method of claim 8, wherein the determining the shortest path from the source node to the virtual vertex includes forcing a first segment through each of the N unordered inclusion nodes.

15. An apparatus comprising at least one processor and memory storing instructions that, when executed, cause the at least one processor to perform steps of:
receiving a request for a path from a source node to a destination node in a network with the request including N unordered inclusion nodes, N≥1;
adding a virtual vertex in a graph with edges connected to each of the N unordered inclusion nodes, wherein the graph includes the virtual vertex, vertices representing nodes in the network, and edges representing links in the network, wherein the virtual vertex does not represent a node in the network and includes edges to it from each of the N unordered inclusion nodes for determining paths thereto;

determining a shortest path from the source node to the virtual vertex and removing an edge from a first inclusion node, that is on the shortest path, from the virtual vertex;

if N>1, determining a shortest path N times to find path segments between the N unordered inclusion nodes, removing an edge from each of the N unordered inclusion nodes from the virtual vertex when on a corresponding shortest path; and determining a shortest path from a last unordered inclusion node to the destination node.

16. The apparatus of claim 15, wherein the steps further include
either removing or ignoring all edges out of the N unordered inclusion nodes while there is an edge to the virtual vertex, to avoid regional revisit on a path segment.

17. The apparatus of claim 16, wherein one of
the network is an optical network, and the regional revisit includes avoidance of a same network element more than once, and
the network is an Ethernet network, and the regional revisit includes avoidance of a same protection or logical ring more than once.

18. The apparatus of claim 15, wherein the determining a shortest path is k-shortest paths.

19. The apparatus of claim 15, wherein the steps further include
concurrently performing a path computation from the destination node to the source node via path segments; and
terminating when a path is found first in either direction.

20. The apparatus of claim 15, wherein the determining the shortest path from the source node to the virtual vertex includes forcing a first segment through each of the N unordered inclusion nodes.

\* \* \* \* \*